(12) United States Patent
Polo-Wood et al.

(10) Patent No.: US 6,199,070 B1
(45) Date of Patent: Mar. 6, 2001

(54) USING A DATABASE FOR PROGRAM LOGS

(75) Inventors: Felipe Polo-Wood; Peter Williams Volkmar, both of Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/099,890

(22) Filed: Jun. 18, 1998

(51) Int. Cl.[7] .................................................. G06F 17/30
(52) U.S. Cl. ......................................... 707/202; 714/20
(58) Field of Search ....................... 714/15, 20; 707/104, 707/202

(56) References Cited

U.S. PATENT DOCUMENTS 5,524,241 * 6/1996 Ghoniemy et al. .................... 707/10

* cited by examiner

Primary Examiner—Paul V. Kulik
(74) Attorney, Agent, or Firm—Marcia L. Doubet; Jeanine S. Ray-Yarletts

(57) ABSTRACT

A technique, system, and computer program for using a database to store program logs. Logged information can be created, stored, displayed, and analyzed in a more usable, efficient manner. Log information is preferably stored in two or more tables, enabling reduction of redundant information through database normalization. Message text is preferably stored in computer-readable, as opposed to human-readable, format. This enables optimization of the amount of storage required, and facilitates normalizing the database tables. In addition, translation to the user's national language is made easier, whereby a message code is stored, pointing to an entry in a table that contains message text in the chosen language. The report-generating facilities of the database manager are available for use in analyzing log entries, eliminating the need to write customized reporting software.

12 Claims, 8 Drawing Sheets

FIG. 3A

Event Log *100*

| *110* LogID | *120* UserName | *130* EventID | *140* EventName | *150* TransactionDate | *160* StartCode | *170* LogCode | *180* Sent2Server |
|---|---|---|---|---|---|---|---|
| 1 | Toolbar | 1 | Connected LAN | 5/22/98 2:09:56 PM | 0 | 10485760 | ☒ *101* |
| 2 | Toolbar | 10 | | 5/22/98 2:10:05 PM | 2 | 0 | ☒ *102* |
| 4 | VQM | 9 | Transmit Audit Flat File | 5/22/98 2:11:20 PM | 4 | 7 | ☐ *103* |
| 5 | VQM | 9 | BIGFILE5.ZIP | 5/22/98 2:12:35 PM | 4 | 3 | ☐ *104* |
| 6 | Toolbar | 3 | Disconnected | 5/22/98 2:13:06 PM | 0 | 0 | ☐ *105* |

FIG. 3B

EventName 200

| EventID 210 | NameOfEvent 220 |
|---|---|
| 1 | Connect 201 |
| 2 | Connect Attempt |
| 3 | Disconnect 202 |
| 4 | Sent item |
| 5 | Received item |
| 6 | Publish |
| 7 | Script |
| 8 | Transport |
| 9 | Queue Headline 203 |
| 10 | History Log 204 |
| 11 | Sent Notes item |
| 12 | Received Notes item |
| 13 | Notes User Update |

FIG. 3C

Xlate 300

| XID | XEvent | XCode | Status |
|---|---|---|---|
| 131072 | 0 | 0 | |
| 131073 | 1 | 1 | RAS logon complete |
| 1179657 | 9 | 0 | Idle |
| 1179658 | 9 | 1 | Queued for transfer |
| 1179659 | 9 | 2 | Transfering |
| 1179660 | 9 | 3 | Suspended |
| 1179661 | 9 | 4 | Complete |
| 1179662 | 9 | 5 | Queued for delete |
| 1179663 | 9 | 6 | Deleted |
| 11796631 | 10 | 1 | Sent DB data to server |
| 11796632 | 10 | 2 | unused |

AuditGUI

| EventID | NameOfEvent | EventName | TransactionDate | LongCode | Status |
|---|---|---|---|---|---|
| 1 | Connect | Connected LAN | 5/22/98 2:09:56 PM | 10485760 | |
| 10 | History Log | | 5/22/98 2:10:05 PM | | unused |
| 9 | Queue Headline | Transmit Audit Flat File | 5/22/98 2:11:20 PM | | Complete |
| 9 | Queue Headline | BIGFILE5.ZIP | 5/22/98 2:12:35 PM | | Complete |
| 3 | Disconnect | Disconnected | 5/22/98 2:13:06 PM | | |

USING A DATABASE FOR PROGRAM LOGS

BACKGROUND OF THE INVENTION

1. Field of the Invention

The present invention relates to computer software, and deals more particularly with a method and apparatus for using a database to store program logs. The amount of data stored can be reduced using data normalization. Data retrieval and display, including statistics and report generation, is simplified by using the existing facilities of the database manager.

2. Description of the Related Art

Software products are customarily written to generate information on the tasks which they perform. The more complex the program, the more important it is to generate information about what is occurring in the program, in case something should go wrong. In the early days of computer use, programs logged information by sending text strings to a dedicated printer, or console, in real time. A human operator could then determine what was occurring in the program by inspecting the log entries as they were written, or by reading the entries that had been written out over a period of time. The log-creation process has evolved over time, to where log information is now written into disk files instead of directly to a printer. These disk files are commonly referred to in a general sense as "program logs", or simply "logs". Some products may create more than one such file, to separate classes of information. An example of this separation could be storing data of interest to the end user in one file (for example, an "activity log") while storing information of interest to a developer in a different file (a "trace log", for example). In either case, the log is a flat file, ordered sequentially according to the time each entry is made. A "flat file" is a file containing simple records that have no complex structure, and no explicit relationships between entries, other than their sequential order. The entries in the flat file consist of fully-formed, human-readable messages. These flat files have no inherent means for sorting, filtering, or analyzing the data they contain. A simple text editor may be used to display the contents of the log, but this does not allow the data to be processed in any way (such as sorting or filtering) to facilitate meaningful interpretation. Alternatively, a custom-written software program may be written to display the log. Custom-written programs are required in order to manipulate the entries in the log—for example, to select only certain entries for viewing, to change the order of the entries, or to revise the contents of entries.

Writing messages that are fully-formed leads to redundant data being stored in the files. When an application logs many messages, the log files can grow to be quite large. When the message text is long, and the same message is logged many times, this is an inefficient use of system resources.

Accordingly, a need exists for a technique by which program-generated logs can be created in a more usable, efficient manner. The present invention provides a technique for storing the messages of program logs in databases. The messages are stored in multiple database files, in order to allow normalization of the message content. Further, the messages are stored in computer-readable form, instead of human-readable form. This technique enables optimization of the storage used for storing the log entries, and eliminates the storage of redundant message text. In addition, this technique allows quick, efficient analysis of log entries without writing custom software, because the report-generating facilities of the database manager—which are provided as part of the database software—can be used. Because the messages are stored in computer readable form, they can be translated into other languages easily and efficiently.

SUMMARY OF THE INVENTION

An object of the present invention is to provide a technique whereby log entries are stored in a more efficient manner.

Another object of the present invention is to provide a technique whereby log entries can be easily and efficiently analyzed.

Yet another object of the present invention is to provide a technique for this analysis which does not require writing custom software.

A further object of the present invention is to provide a technique whereby log entries can be translated into various languages in an optimal manner.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a system, method, and computer-readable code for use in a computing environment, for using a database to store program logs. This technique comprises: a subprocess for generating a plurality of log entries; a subprocess for accessing one or more database tables; and a subprocess for storing said generated log entries in said one or more database tables. Preferably, this technique further comprises a subprocess for using one or more predefined database tables, such that said one or more database tables are at least partially normalized. The facilities of a database manager may be used to process said stored log entries. In addition, each of said generated log entries may comprise a plurality of fields, and one or more of said fields may be stored in machine-readable format.

The present invention will now be described with reference to the following drawings, in which like reference numbers denote the same element throughout.

BRIEF DESCRIPTION OF THE DRAWINGS

FIGS. 3A–3C illustrate representative formats of database tables that may be used for the present invention, and include sample data that might be generated by a software program that logs events;

FIG. 5 depicts a log display that may be created with the present invention using a simple database command.

DESCRIPTION OF THE PREFERRED EMBODIMENT

Figure 1:
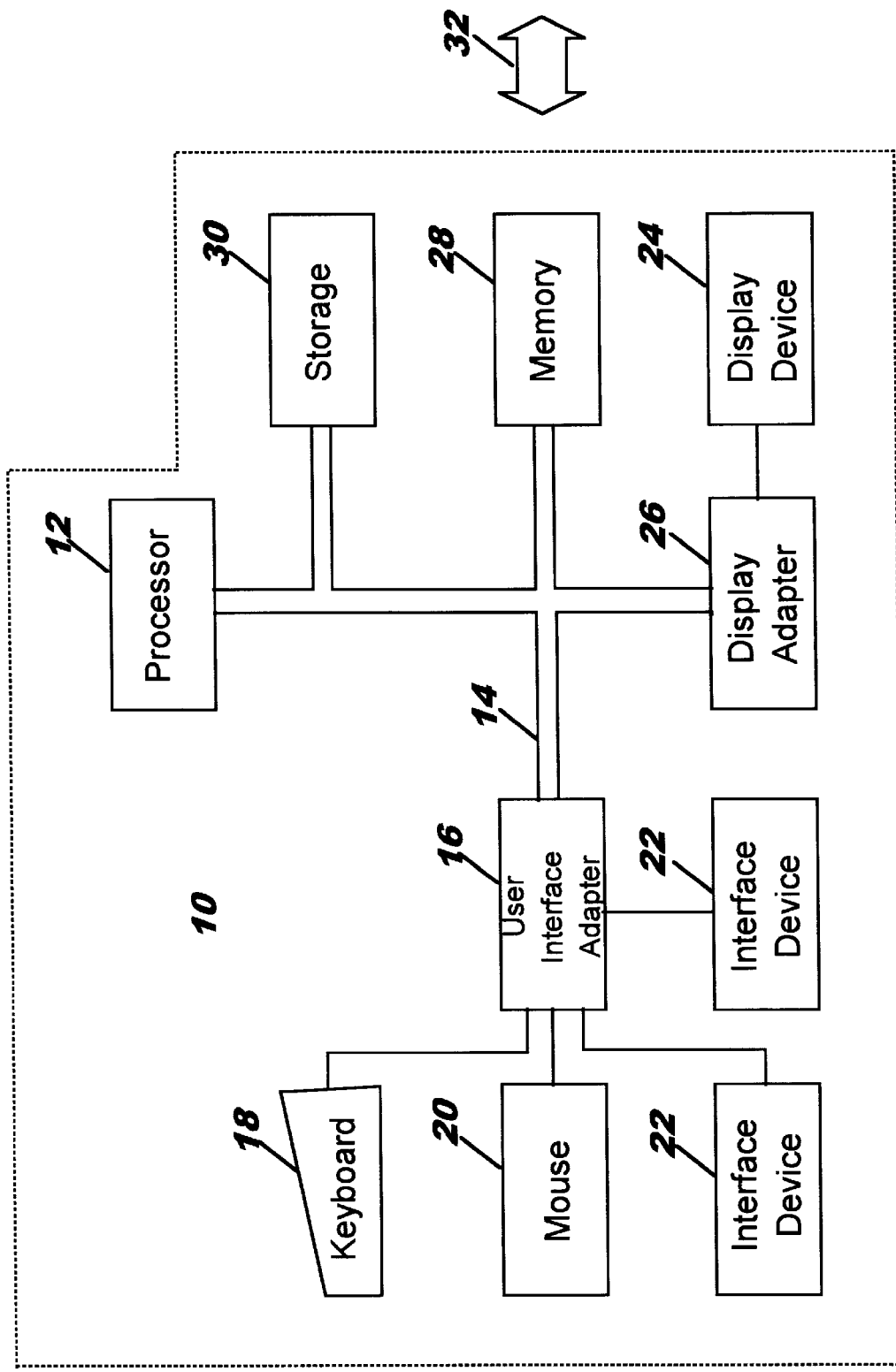
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network (WAN), the workstation 10 can be a client in a client/server arrangement with another computer, it may be a standalone computer not connected to a network, etc. All of these configurations, as well as the appropriate communications hardware and software, are known in the art.

Figure 2:
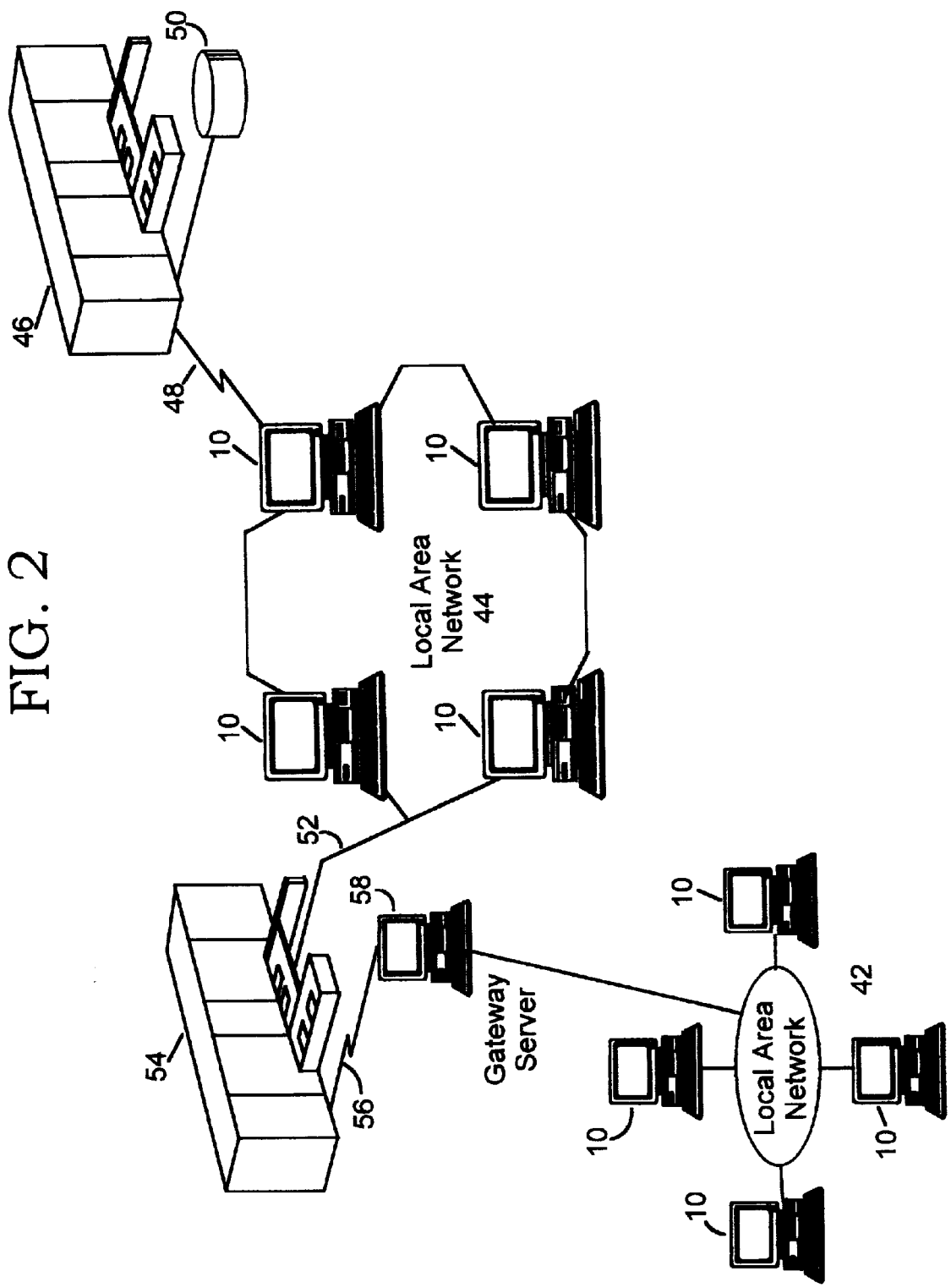
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM), or any other type of mainframe computer. Depending on the application, a midrange computer, such as an Application System/400 (also known as an AS/400) may be employed. "Enterprise Systems Architecture/370" is a trademark of IBM; "Enterprise Systems Architecture/390", "Application System/ 400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/ communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The log message reports resulting from use of the present invention may be displayed on any of the various display devices 24, and accessed using any type of interface device such as a keyboard 18, mouse 20, and/or other interface devices 22 (including a touch sensitive screen, digitized entry pad, etc.). Additionally, the reports may be displayed on a printer attached to the workstation 10 or other computer. The database files created by the present invention may be stored on a variety of known media for use with a database system, such as a diskette or hard drive. The database system used by the present invention may be stored and accessed from a workstation 10, or it may be stored remotely, for example on a server 46.

The preferred embodiment of the present invention will now be discussed with reference to FIGS. 3 through 5.

In the preferred embodiment, the present invention is implemented as a computer software program. The implementation of the invention may be used with any software application that creates messages for one or more logs. The application may execute entirely on the user's computer, as a stand-alone software package, or it may execute partly on the user's computer and partly on a remote computer. In the latter scenario, the remote computer may be connected to the user's computer through a LAN or a WAN that is part of a network owned or managed internally to the user's company, or the connection may be made to an external computer (for example, through the Internet using an Internet Service Provider).

Rather than first constructing a human-readable message, and then appending it to a sequential file as done in the prior art, the present invention writes the collection of data that would normally be logged about an event as records in database tables. In the preferred embodiment, this data is in machine-readable form, to allow reduction of the logged data to a minimal form. For example, a time and date value is preferably stored in computer format, such as a floating point number. The fraction may represent the time, while the whole number represents the day. This technique takes less storage space than using a text string format, such as "Jan. 01, 1999 12:34 am".

Displaying the log is accomplished using database commands and/or utilities. Database utilities may be incorporated into the product creating the log entries, or they may be utilized by invoking methods (in an object-oriented language) or procedure calls or functions (in a conventional procedure-oriented language) of a database management system. Manipulating the log for the purposes of analysis can be accomplished using database commands and/or the report generating facilities of the database system.

The technique of the present invention provides several benefits. First, the utility of the log is enhanced. The information stored therein can be viewed in a number of ways, which may be dynamically chosen by the user, using database functions to order and filter the data. For example, a display of only a specific type of activity (such as messages which may be categorized as "critical", or messages pertaining to activity on a specified file, etc.) can be generated by selecting records meeting that criteria. Analysis of relationships between activities, not available in the prior art without customized programming, is now available through the power of the report-generating language (such as the Structured Query Language, or "SQL").

Second, this technique provides for easier implementation of logging within a software application. This in turn leads to code that is less costly to write and less error-prone, so that it will also be less costly to support. Database systems typically are packaged with utilities to access and display the information which the databases contain. Some of these utilities can be included as components packaged into other programs, such as the software applications that will use this present invention. Thus, a large part of the writing, reading, and displaying of the log entries can be performed by the existing database manager components, rather than having to custom-write them.

Third, supporting translation into other languages is made easier. "National language support" is a term used in the art to describe making the user interface of a software application, including messages, help text, etc., available in the user's own national language. By maintaining the log in computer-readable, rather than human-readable, form, the translation into the user's language can be done just before presenting the material to the user. This enables one common (machine-readable, untranslated) storage format to be used for the base data, simplifying support of the implementing product. For example, as stated earlier, date and time information is preferably stored in machine-readable format. A translation of this format into human-readable form is performed as the information is being displayed or printed, at which time the local convention (the order of the month and day, for example) can be used. Text strings, which require translation into the user's national language before displaying or printing, can be maintained in separate database tables. The common storage format stored in the logged entry would be a code used as the index value or key to retrieve the text string from the table, enabling each such code to point to the translated message text in the user's language.

Another benefit of the present invention is the reduction in storage that is achieved from removing redundant information from the log entries. This is achieved through database normalization, whereby data that is used in more than one entry can be moved to a separate database table (where it is included only once), allowing the multiple referencing entries to point to this separate entry—instead of duplicating the data in each referencing entry. The referencing entry and the referenced data are then joined together for displaying or printing using a database join operation. This storage technique also enables replacing the message text, as was described above, with message text in various languages.

The preferred embodiment uses two or more database tables. FIGS. 3A–3C illustrate representative formats of three database tables that may be used for the present invention, to present sample data that might be generated by a software program that logs events. However, the inventive concepts of the present invention are not limited to database tables having this particular structure, nor to use with three tables: more tables, or fewer tables, may be used, depending on the needs of the particular application.

The first database table, which is a required table of the preferred embodiment, is the main repository of information about each event being recorded. This table will be referred to herein as the "Event Log". A representative event log 100 is depicted in FIG. 3A. An entry will be created in this table for every event being logged. The fields of this entry are application-dependent, but it include at least a primary key with which the record can be accessed, and one or more data fields. Any number of these data fields may be values that can be used to access entries in other database tables. As is known in the art, columns of a relational database correspond to a particular field of each entry, and the rows of the database correspond to the entries, or records, of the table.

In FIG. 3A, the primary key field is designated by the column identifier "LogID" 110. By definition, a primary key must have a unique value, as is well known to one of ordinary skill in the art. The manner in which this unique value is generated does not form part of the present invention. It may be a value having significance to the software application, or it may simply be a sequentially-generated number. In this latter case, a separate file may be used to keep track of the last-used value, in order for the application to know which value to use each time it creates a log entry. As shown in FIG. 3A, the primary keys of each row 101, 102, 103, 104, and 105 proceed in sequential order.

The "UserName" column 120 contains text which identifies the component which generated this event. This is an optional, application-specific column. The entries here show how redundant text may exist in a database that is not fully normalized. That is, rows 101, 102, and 105 all contain the same text entry "Toolbar". This text is fairly short, and thus redundant storing of this information may not lead to serious inefficiencies. However, if this entry occurred many times throughout the tog, or if this redundant entry was a long text string, normalization could be applied to move the string to a different table (as previously discussed, and as is known in the art) increasing the benefits of storing log messages with the present invention.

The "EventID" column 130 is an example of a field that has been normalized. The values in a column such as this one point to entries (rows) in a different database table. In this example, the values point to entries in the "EventName" table 200, depicted in FIG. 3B. As shown by this example, the rows 103 and 104 both contain the EventID value of 9. Using this value to index the EventName table 200 retrieves the name of the event, which is "Queue Headline", as shown in row 203 of the EventName table 200 in FIG. 3B.

The "EventDate" column 150 represents the date and time at which this log entry (row) was created. Event logs typically include time and/or date entries, in order to analyze the events of the log with reference to their relative occurrence. Note that these date and time values have been translated for printing, from the computer-readable floating point format in which they were preferably stored.

The "ShortCode" column 160 is another example of an application-dependent field that makes use of normalized data. The values of this column, along with the values of the EventID column 130, are used together to index the "Xlate" table 300, depicted in FIG. 3C. Use of more than one field value to form a key for accessing a database is well known in the art. This example shows the heavily-used "Status" field 340, further described below, having been moved to the separate Xlate table 300 in order to avoid redundantly writing the status code descriptions in each row of the EventLog table 100.

The "LongCode" column 170 is yet another application-dependent field, which contains values that may or may not be used to index other tables, as defined by the application.

The "Sent2Server" column 180 illustrates an optional feature of this preferred embodiment, which is described more fully with reference to FIG. 4. In this example, the field has either the Boolean value TRUE or FALSE. The presence of the checked box in rows 101 and 102 is an indication that the value of these rows is TRUE. An internal, machine-readable form may have been used to store this Boolean data, so that the values were translated to the human-readable format shown here upon printing.

FIG. 3B shows a second database table, which contains entries pointed to by rows of the main table in FIG. 3A. Such a table is required whenever normalization has been used. Corresponding to the EventLog table 100 of FIG. 3A, this table contains the full names of the events that are being logged. The text strings that make up this table are preferably defined when the software application is written, or when it is installed, so that the table is accessed in read-only mode during operation of the software application (as log entries are created). The table is also used in a read-only mode during analysis of log entries.

The table depicted in FIG. 3B will be referred to herein as the "EventName" table 200. Representative event names are depicted in the rows of this table. The "EventID" column 210 is the primary key of this table, having a unique value that enables the entries of the table to be accessed. For example, using the primary key value "1" (shown in the "EventID" column 210 for row 201) retrieves the value from the "NameOfEvent" column 220, which in this instance is "Connect".

FIG. 3C depicts another table that is referenced by the EventLog table 100. The table illustrated will be referred to herein as the "Xlate" table 300. The "XID" column 310 contains the primary key for this table. The "XEvent" column 320 and "XCode" column 330 contain values that may be used together to retrieve values from the "Status" column 340, as an alternative access method to using the primary key. In this example, the XEvent column 320 corresponds to the EventID column 130 of EventLog table 100, and the XCode column 330 corresponds to the ShortCode column 160 of that same table. When the EventID column 130 has value 9, and the ShortCode column 160 has value 4, as shown in rows 103 and 104, the Status value retrieved from the Xlate table 300 will be "Complete", as shown in row 301.

A table such as that shown in FIG. 3B or 3C will be used for message text that is being normalized out of the database records of the main table, in order to eliminate storage of redundant data, according to the present invention. Multiple tables of this type may be used if multiple database fields have textual content being normalized in this manner. The procedure used to create the entries of tables such as those shown in FIGS. 3B and 3C does not form part of the present invention.

Figure 4A:
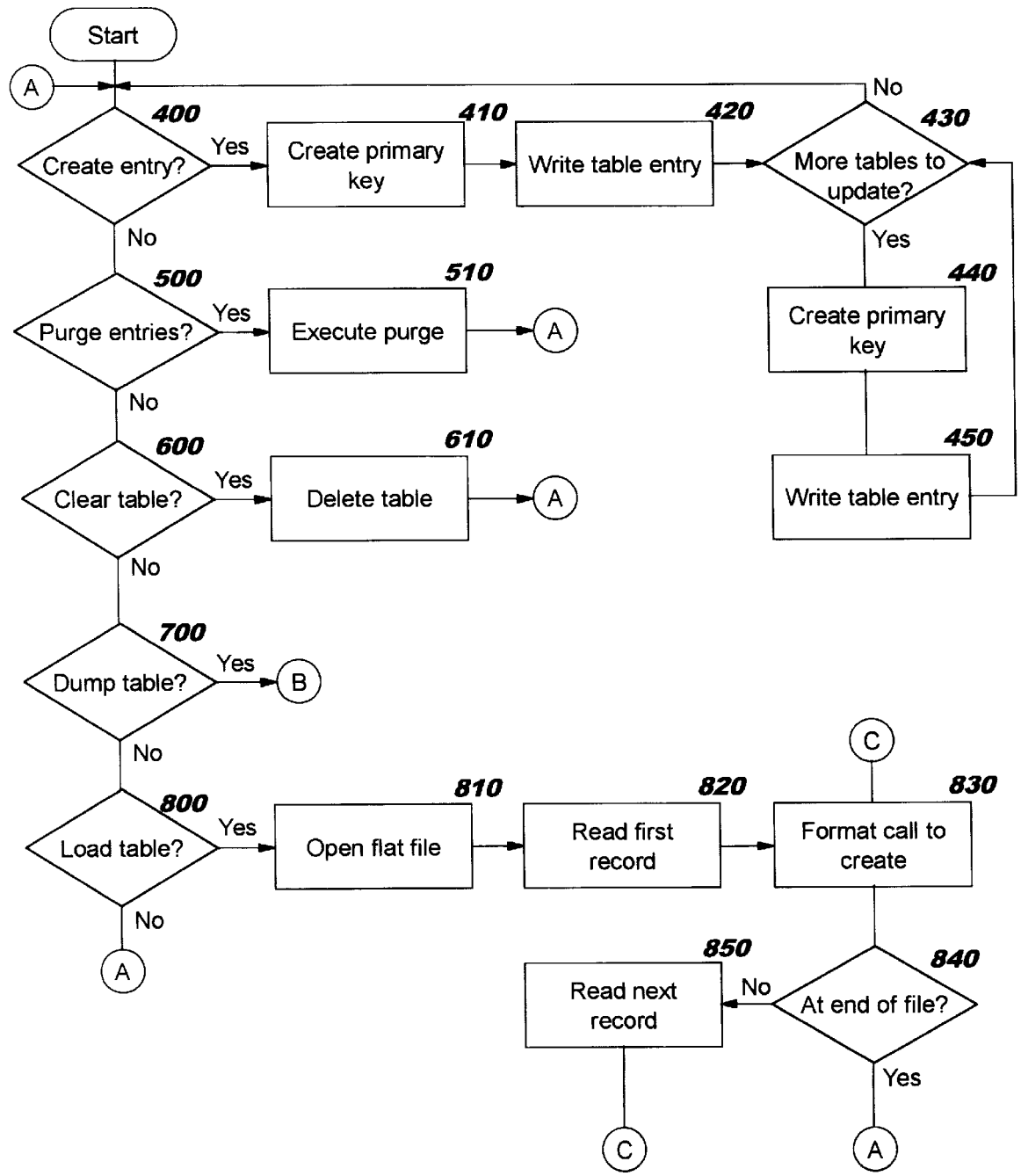
FIGS. 4A–4B illustrate a flow chart which sets forth the logic involved with the present invention to write log messages to database tables, and perform optional maintenance functions on the tables.
Figure 4B:
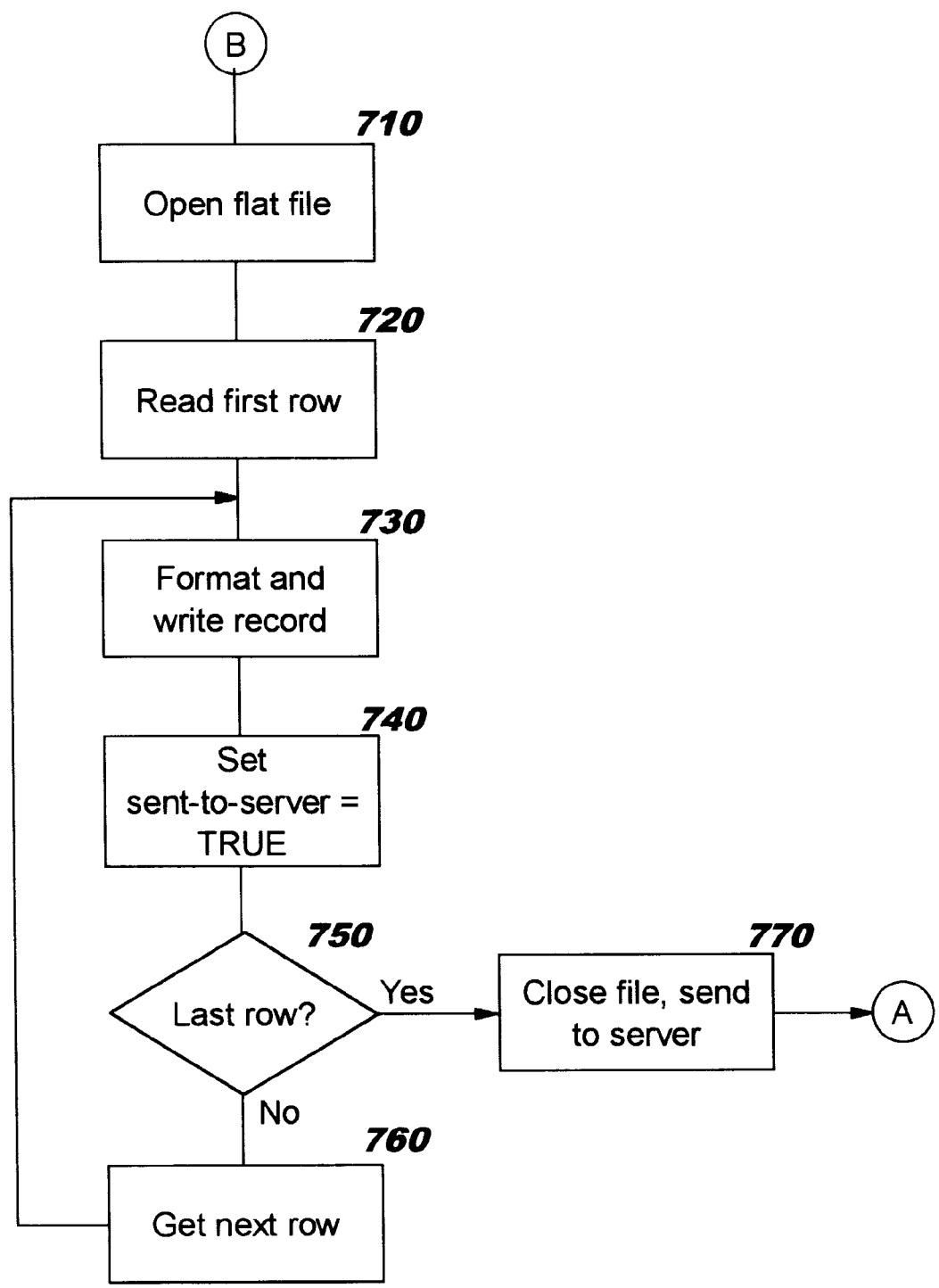

FIGS. 4A–4B illustrate the logical steps performed to write log messages to database tables, and perform various housekeeping functions on those tables, according to the present invention. The process of FIG. 4 may be embedded within the software application that is performing logging, or it may be written as a program that is accessible from such a software application. This figure represents the logic used to process only those actions of interest to the present invention. The process begins at Block 400, where a test is made to determine whether the current action of interest is creating a new log entry. If this test has a positive response, control transfers to Block 410; otherwise, control transfers to Block 500.

At Block 410, a primary key is created, for use in writing the table entry of the main table. The manner in which this key is created does not form part of the present invention. What is required is that a unique value is obtained. At Block 420, the entry that will comprise a new row of the main table is formatted and written. Preferably, the values to be used for each column of the table will be passed as parameters on the request for creating the new entry. Alternatively, some values, such as the time and date, may be obtained by invoking commands or utilities of the computer system. Other values may require accessing storage, such as another database table, to retrieve a value. This may be the case when data has been normalized, and a pointer to referenced data is being used when formatting the current table entry. For example, to determine the proper value for a field such as UserName 120, a storage location containing this information may need to be accessed. When each value to be written in the current entry has been properly assigned, the facilities of the database manger will be invoked as part of the Block 420 processing, causing the update of the database table.

Block 430 asks whether there are any more database entries to be written. Typically, each invocation of the create function will create an entry for only one table, in which case Block 430 has a negative response, and control transfers back to Block 400 to await the next action. However, there may be applications which need to create multiple entries for a single create invocation. In that situation, Block 440 creates a unique primary key for this additional table entry, and Block 450 formats and writes that entry, in the same manner described above for Blocks 410 and 420. The test at Block 430 is then repeated, allowing each table entry to be created before returning to the main processing flow at Block 400.

Control reaches Block 500 when the action requested was not for creating a new table entry. Block 500 tests whether the request was for purging selected rows from a database table. This is an optional feature of the preferred embodiment, which enables pruning old rows from tables to keep the most current, and therefore most relevant, log entries in the table. Purging the contents of the database can be easily accomplished by using database functions to select only those records which are to be purged. For example, if records are removed after they have been in the database for some number of days (e.g. DaysOld), the following SQL statement could be used to create a recordset consisting only of those records:

SELECT*FROM *EventLog* WHERE((*Date*( )-*EventDate*)>*DaysOld*);

This eliminates the need to programmatically search the entire database, and can benefit from the efficiency of database indexing on the purge field. Block 510 indicates this by a single "Execute purge" action. Following completion of the purge operation, control returns to Block 400.

Block 600 checks to see if the requested action is to clear the database table. Again, this is an optional function provided with the preferred embodiment. When this function is requested, each row of the applicable table will be deleted. Block 610 indicates this by a single "Delete table" action. Typically, a facility of the database manager such as "Delete_All", or a "Delete*", where the asterisk serves as a wildcard to indicate selection of all rows, will be used. Execution of this clear function results in an empty table. As is known in the art, rows of other tables may be deleted by the database manager during this process, to enforce referential integrity. However, this does not form part of the present invention, and will not be discussed further.

Block 700 checks to see if the requested action was to dump the contents of a database table. This is an optional feature of the present invention, which may be used together with the load feature discussed below at Block 800. The purpose of the dump feature is to extract the data from the main database table (the EventLog table 100, in the example used in FIG. 3), and create a flat file from it. This will typically be done when the present invention is being used in a client-server, or three-tier, system. In that case, the dump feature is preferably invoked at the client's machine (Tier 1), creating a file that can be sent through the network to a server machine (Tier 2). The server can then use the load feature, recreating database entries from the flat file. This enables the server to access the log data, performing application-dependent analysis. Typically, the database entries will be recreated on a data server located conceptually in Tier 3.

Block 710 indicates that the flat file is to be opened, in order to write records into it. The name to be used for this file may be passed as a parameter of the dump feature invocation, or a predetermined static file name may be used, depending on the needs of the application. Block 720 reads the first row of the database table. Block 730 formats this row into a record for the flat file, and writes a record into that file. The techniques with which files are opened, written to, and closed are well known in the art.

At Block 740, the preferred embodiment sets a "sent to server" flag to TRUE, to prevent duplicate copies of the same log information from being transferred to the server. This corresponds to the "Sent2Server" field 180 of the EventLog table 100 in the example shown in FIG. 3A.

Block 750 tests whether this was the last row of the database table. If not, the next row is read at Block 760, and the process of writing records to the flat file continues by returning to Block 730. Otherwise, when the last row has been processed, Block 770 closes the flat file and sends it to the server (using techniques which are well known in the art). Alternatively, the flat file may be sent at some later time. Control returns to Block 400.

Block 800 implements the complementary load function that may be used with the dump function. Typically, this function will be invoked in a server. The software application written to use the dump and load functions will typically include logic to receive an event upon arrival of a message containing the flat file, and will then invoke the process of Blocks 810 through 850.

Block 810 opens the flat file, which it may have received from the client. Block 820 reads the first record from this file. Block 830 formats the fields from this record into a call to the create function of Blocks 410 through 440, and invokes that create call. When control returns to Block 830 from the call, control will transfer to Block 840, which tests to see if this was the last record in the flat file. If the answer is Yes, the load function is complete, and control returns to Block 400. Otherwise, Block 850 reads the next record from the flat file. The process of Blocks 830 through 850 is repeated for each record in the file, until the end is detected at Block 840.

Although no end is shown for the process in FIG. 4, it will be obvious to one of ordinary skill in the art that additional logic is required (using techniques which are well known in the art) to detect that the logging process is ending.

FIG. 5 depicts a log display that may be created with the present invention using a simple database command. Preferably, the logged information will have been stored into a database that is accessible using SQL. SQL statements, or statements in another query language which can be used with the database tables that were created, can then be issued to analyze the log data in any number of ways, according to the interests of the person who will perform the analysis. To display the information from a table using SQL, a SELECT statement is used, which will include one or more JOIN operators to include data from tables referenced by a main table. The syntax of SQL statements is known in the art. The display of FIG. 5 was created from the example tables shown in FIG. 3 using the following SQL statement:

```
SELECT EventLog.EventID, EventName.NameOfEvent, EventLo-
    g.EventName, EventLog.EventDate, EventLog.LongCode,
    Xlate. Status FROM EventName INNER JOIN (EventLog
    LEFT JOIN Xlate ON (EventLog.EventID=Xlate.XEvent)
    AND (EventLog.ShortCode=Xlate.XCode)) ON EventNam-
    e.EventID=EventLog.EventID;
```

Alternatively, an SQL-compliant report generator product could be used, which prompts a user and builds the SQL statements automatically that will implement the user's desired query.

In the example used herein, message text was stored in the tables EventName 200 (for the field NameOfEvent 220) and Xlate 300 (for the Status field 340). These entries are pointed to by the values stored in the main table, EventLog 100, in the fields EventID 130 and the combination of fields EventID 130 and ShortCode 160, respectively. Translation into a language other than English can be easily accomplished by substituting different tables for EventName 200 and Xlate 300. The text of the NameOfEvent field 220 would be translated into the user's desired language, at some point prior to invoking the display of the log, while the codes stored in the EventID field 210 would remain unchanged. The translated text would then automatically appear in the display resulting from the user's query (such as the display shown in FIG. 5). Similarly, the text of the Status field 300 would require translation, while the codes used to identify these text strings (XEvent 320 and XCode 330) would remain unchanged.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment, computer readable code for using a database to store program logs, said computer readable code comprising:

a subprocess for generating a plurality of log entries;

a subprocess for accessing one or more program logging database tables;

a subprocess for using one or more predefined database tables, such that said one or more program logging database tables are at least partially normalized; and a subprocess for storing said generated log entries in said one or more program logging database tables.

2. Computer readable code for using a database to store program logs according to claim 1, further comprising:

a subprocess for using facilities of a database manager to process said stored log entries.

3. Computer readable code for using a database to store program logs according to claim 2, wherein each of said generated log entries comprises a plurality of fields, and wherein one or more of said fields are stored in machine-readable format.

4. Computer readable code for using a database to store program logs according to claim 3, wherein one of said fields is a sent flag which indicates whether said generated log entry has been sent to a server, and further comprising:

a subprocess for sending selected ones of said generated log entries to said server; and a subprocess for setting said sent flag in said selected ones of said generated log entries, responsive to operation of said subprocess for sending.

5. A system for using a database to store program logs in a computing environment, said system comprising:

means for generating a plurality of log entries;

means for accessing one or more program logging database tables;

means for using one or more predefined database tables, such that said one or more program logging database tables are at least partially normalized; and means for storing said generated log entries in said one or more program logging database tables.

6. The system for using a database to store program logs according to claim 4, further comprising:

means for using facilities of a database manager to process said stored log entries.

7. The system for using a database to store program logs according to claim 6, wherein each of said generated log entries comprises a plurality of fields, and wherein one or more of said fields are stored in machine-readable format.

8. The system for using a database to store program logs according to claim 7, wherein one of said fields is a sent flag which indicates whether said generated log entry has been sent to a server, and further comprising:

means for sending selected ones of said generated log entries to said server; and means for setting said sent flag in said selected ones of said generated log entries, responsive to operation of said means for sending.

9. A method for using a database to store program logs in a computing environment, said method comprising the steps of:

generating a plurality of log entries;

accessing one or more program logging database tables;

using one or more predefined database tables, such that said one or more program logging database tables are at least partially normalized; and storing said generated log entries in said one or more program logging database tables.

10. The method for using a database to store program logs according to claim 9, further comprising the step of using facilities of a database manager to process said stored log entries.

11. The method for using a database to store program logs according to claim 10, wherein each of said generated log entries comprises a plurality of fields, and wherein one or more of said fields are stored in machine-readable format.

12. The method for using a database to store program logs according to claim 11, wherein one of said fields is a sent flag which indicates whether said generated log entry has been sent to a server, and further comprising the steps of sending selected ones of said generated log entries to said server; and setting said sent flag in said selected ones of said generated log entries, responsive to operation of said sending step.

* * * * *